United States Patent
Kaxiras et al.

(10) Patent No.: US 11,334,485 B2
(45) Date of Patent: May 17, 2022

(54) SYSTEM AND METHOD FOR DYNAMIC ENFORCEMENT OF STORE ATOMICITY

(71) Applicant: ETA SCALE AB, Uppsala (SE)

(72) Inventors: Stefanos Kaxiras, Uppsala (SE); Alberto Ros, Cartagena (ES)

(73) Assignee: ETA SCALE AB, Uppsala (SE)

( * ) Notice: Subject to any disclaimer, the term of this patent is extended or adjusted under 35 U.S.C. 154(b) by 338 days.

(21) Appl. No.: 16/715,771

(22) Filed: Dec. 16, 2019

(65) Prior Publication Data

US 2020/0192801 A1 Jun. 18, 2020

Related U.S. Application Data

(60) Provisional application No. 62/779,571, filed on Dec. 14, 2018.

(51) Int. Cl.
| | |
|---|---|
| *G06F 12/0815* | (2016.01) |
| *G06F 12/0891* | (2016.01) |
| *G06F 12/084* | (2016.01) |
| *G06F 9/38* | (2018.01) |

(Continued)

(52) U.S. Cl.
CPC ...... *G06F 12/0815* (2013.01); *G06F 9/30043* (2013.01); *G06F 9/3816* (2013.01); *G06F 9/3842* (2013.01); *G06F 9/3855* (2013.01); *G06F 9/4881* (2013.01); *G06F 12/084* (2013.01); *G06F 12/0891* (2013.01)

(58) Field of Classification Search
None
See application file for complete search history.

(56) References Cited

U.S. PATENT DOCUMENTS

| | | | | |
|---|---|---|---|---|
| 8,639,886 | B2 * | 1/2014 | Bell | G06F 9/3857 |
| | | | | 711/137 |
| 2003/0084259 | A1 * | 5/2003 | Palanca | G06F 9/3012 |
| | | | | 711/163 |

(Continued)

OTHER PUBLICATIONS

Agarwal et al., "Garnet: A Detailed On-Chip Network Model inside a Full-System Simulator," IEEE International Symposium on Performance Analysis of Systems and Software, ISPASS 2009, Apr. 26-28, 2009, Boston, MA, US.

(Continued)

*Primary Examiner* — Kaushikkumar M Patel
(74) *Attorney, Agent, or Firm* — Patent Portfolio Builders PLLC

(57) ABSTRACT

A computer system for dynamic enforcement of store atomicity includes multiple processor cores, local cache memory for each processor core, a shared memory, a separate store buffer for each processor core for executed stores that are not yet performed and a coherence mechanism. A first processor core load on a first processor core receives a value at a first time from a first processor core store in the store buffer and prevents any other first processor core load younger than the first processor core load in program order from committing until a second time when the first processor core store is performed. Between the first time and the second time any load younger in program load than the first processor core load and having an address matched by coherence invalidation or an address matched by an eviction is squashed.

20 Claims, 5 Drawing Sheets

(51) Int. Cl.
*G06F 9/48* (2006.01)
*G06F 9/30* (2018.01)

(56) References Cited

U.S. PATENT DOCUMENTS

| | | | | | |
|---|---|---|---|---|---|
| 2004/0064656 | A1* | 4/2004 | Hangal | ............... | G06F 12/0815 711/154 |
| 2005/0247774 | A1* | 11/2005 | Sander | ................. | G06F 9/3842 235/375 |
| 2008/0288834 | A1* | 11/2008 | Manovit | ............. | G06F 11/3612 714/718 |
| 2013/0166886 | A1* | 6/2013 | Sasanka | .................... | G06F 9/54 712/216 |
| 2015/0067230 | A1* | 3/2015 | Avudaiyappan | ...... | G06F 9/3826 711/3 |
| 2015/0100734 | A1* | 4/2015 | Abdallah | ............ | G06F 9/30043 711/125 |
| 2018/0373541 | A1* | 12/2018 | Ros | ....................... | G06F 9/3834 |
| 2020/0174796 | A1* | 6/2020 | Swanson | ............... | G06F 9/3867 |

OTHER PUBLICATIONS

Alglave et al., "Fences in Weak Memory Models," Proceedings of the 22nd International Conference on Computer Aided Verification (CAV '10), pp. 258-272, Jul. 15-19, 2010, Edinburgh, UK.

Arvind et al., "Memory Model = Instruction Reordering + Store Atomicity," 33rd Annual Symposium on Computer Architecture (ISCA '06), Jun. 17-21, 2006, Boston, MA, US.

Baer, "Microprocessor Architecture: From Simple Pipelines to Chip Multiprocessors," 2010, Cambridge University Press, New York.

Bienia et al., "The PARSEC Benchmark Suite: Characterization and Architectural Implications," PACT '08, Oct. 25-29, 2008, Toronto, ON, CA.

Buyuktosunoglu et al., "An Oldest-First Selection Logic Implementation for Non-Compacting Issue Queues," 15th Annual IEEE International ASIC/SOC Conference, Sep. 25-28, 2002, Rochester, NY, US.

Carlson et al., "Sniper: Exploring the Level of Abstraction for Scalable and Accurate Parallel Multi-Core Simulation," SC'11, Nov. 12-18, 2011, Seattle, WA, US.

Duan et al., "SCsafe: Logging Sequential Consistency Violations Continuously and Precisely," 2016 International Symposium on High Performance Computer Architecture (HPCA), Mar. 12-16, 2016, Barcelona, ES.

Gharachorloo et al., "Two Techniques to Enhance the Performance of Memory Consistency Models," Proceedings of the 1991 International Conference on Parallel Processing, Aug. 1991.

Gharachorloo, "Memory Consistency Models for Shared-Memory Multiprocessors," WRL Research Report 95/9, Dec. 1995.

IBM, "IBM System/370 Principles of Operation," GA22-7000, Jun. 1970.

Lenoski et al., "The Stanford Dash Multiprocessor," Computer, vol. 25, No. 3, Mar. 1992.

Mador-Haim et al., "Generating Litmus Tests for Contrasting Memory Consistency Models," Proceedings of the 22nd International Conference on Computer Aided Verification (CAV '10), pp. 273-287, Jul. 15-19, 2010, Edinburgh, UK.

Martin et al., "Mulitfacet's General Execution-driven Multiprocessor Simulator (GEMS) Toolset," Computer Architecture News, Sep. 2005.

Ros et al., "Non-Speculative Load-Load Reordering in TSO," Proceedings of the 44th Annual International Symposium on Computer Architecture, ISCA'17, Jun. 24-28, 2017, Toronto, ON, CA.

Ros et al., "The Superfluous Load Queue," Proceedings of the 51st Annual IEEE/ACM International Symposium on Microarchitecture, Oct. 20-24, 2018, Fukuoka, JP.

Roth, "Store Vulnerability Window (SVW): Re-Execution Filtering for Enhanced Load Optimization," 32nd International Symposium on Computer Architecture (ISCA '05), Jul. 4-8, 2005, Madison, WI, US.

Sakalis et al., "Splash-3: A Properly Synchronized Benchmark Suite for Contemporary Research," IEEE International Symposium on Performance Analysis of Systems and Software (ISPASS), Apr. 17-19, 2016, Uppsala, SE.

Sewell et al., "x86-TSO: A Rigorous and Usable Programmer's Model for x86 Multiprocessors," Communications of the ACM, vol. 53, No. 7, Jul. 2010.

Sorin et al., "A Primer on Memory Consistency and Cache Coherence," Synthesis Lectures on Computer Architecture, 2011, Morgan & Claypool Publishers.

Yoaz et al., "Speculation Techniques for Improving Load Related Instruction Scheduling," Proceedings of the 26th International Symposium on Computer Architecture, May 1-4, 1999, Atlanta, GA, US.

Zhang et al., "Constructing a Weak Memory Model," 45th International Symposium on Computer Architecture (ISCA), Jun. 2018.

\* cited by examiner

SYSTEM AND METHOD FOR DYNAMIC ENFORCEMENT OF STORE ATOMICITY

CROSS-REFERENCE TO RELATED APPLICATIONS

The present application is related to, and claims priority from, U.S. Provisional Patent Application No. 62/779,571 filed on Dec. 14, 2018, entitled "SYSTEM AND METHOD FOR DYNAMIC ENFORCEMENT OF STORE ATOMICITY" to Alberto Ros and Stefanos Kaxiras, the entire disclosure of which is incorporated herein by reference.

TECHNICAL FIELD

The disclosed invention relates to memory model implementation in out-of-order execution processor architectures. Embodiments described herein relate in general to memory system access ordering and instruction ordering in multiprocessor systems and, more particularly, to providing efficient speculative store atomicity.

BACKGROUND

Memory consistency models specify program correctness in terms of program order and memory order. Program order is the order in which memory access instructions are performed, i.e., read and write memory, in each thread. Memory order is the order in which accesses from different cores read and write memory. Sequential Consistency (SC) requires that the four possible program orders among loads and stores, load→load, store→store, store→load and load→store, must appear to be respected at all times in the global memory order. In Total Store Order (TSO), the store→load order is relaxed to accommodate a store buffer, which is a critical component for performance. The store buffer allows a core to commit its store instructions and continue executing without having to wait for the stores to write memory. In TSO, a younger load bypasses older unperformed stores (on different addresses) in the store buffer, hence the store→load order is relaxed.

Some implementations of Total Store Order (TSO) implementations, for example, x86-TSO and Scalable Processor Architecture-TSO (SPARC-TSO), relax strict store atomicity by allowing a core to see its own stores while they are executed and perhaps retired but not yet inserted in the global memory order. Allowing a core to see its own stores and letting a load take its value from the most recent matching store in the store buffer, if such a store exists, is known as store-to-load forwarding, and store-to-load forwarding is used to safeguard the local thread's sequential program semantics while achieving high performance. If store-to-load forwarding is allowed without guaranteeing that all other threads can also see the same store at that time, store atomicity is not preserved, i.e., some threads see stores earlier than others. A violation of store atomicity can violate the load→load order. If this is undesirable, memory fence instructions must be inserted in the program to enforce correct ordering.

SUMMARY OF THE INVENTION

Exemplary embodiments are directed to systems and methods where loads performed by a forwarding from a store in the store buffer are not speculative; however, younger loads performed after that forwarding are speculative. Store atomicity is dynamically enforced only when the detection of its violation actually occurs. In practice, these cases are rare during the execution of a program. In all other cases, i.e., during the bulk of the execution of a program, store-to-load forwarding can be done without violating store atomicity.

Exemplary embodiments are directed to a computer system or computing system containing a plurality of processor cores and a separate local cache memory associated with and operatively coupled to each processor core. Each local cache memory includes cache lines only accessible by the processor core associated with that local cache memory. A shared memory is operatively coupled to each local cache memory and is accessible by each processor core. A separate store buffer is associated with and operatively coupled to each processor core for placing processor core stores from the associated processor core when the processor core stores are executed, i.e., by the processor core, and before the processor core stores are performed in the shared memory. In one embodiment, each store buffer includes committed processor core stores and uncommitted processor core stores. The computer system includes a coherence mechanism to keep processor cores and shared memory coherent. A first processor core load on a first processor core receives a value at a first time from a first processor core store in the store buffer of the first processor core and prevents any other first processor core load younger than the first processor core load in program order from committing until at the earliest a second time when the first processor core store is performed globally in the memory system and visible to all cores. In addition, between the first time and the second time any other first processor core load younger in program order than the first processor core load and having an address matched by a coherence invalidation caused by another processor core or having an address matched by an eviction in any local cache memory associated with the first processor core is squashed.

In one embodiment, the computer system includes a load queue associated with and operatively coupled to each processor core and having a head. The load queue contains the first processor core load and all other first processor core loads, and only the first processor core load is capable of passing the head to commit before the first processor core store is performed. In one embodiment, an identifier key or a unique identifier key encoding a load order is associated with the first processor core load and the first processor core store. Identifier keys can be reused; however, a given identifier key is uniquely associated with a given core or load until that identifier key is removed. A commit gate is located in the load queue, for example at the head of the load queue, and has a single gate bit and an identifier key register. In one embodiment, the gate bit includes a closed state where no processor core loads can commit and an open state where processor core loads can commit. The identifier key is registered in the commit gate and used to authorize moving the gate bit from the closed state to the open state.

In one embodiment, the computer system includes a tracking mechanism in communication with the store buffer and associated with the first processor core to tag the first processor core store, to determine when the first processor core store exits the store buffer and to notify the first processor core to stop or to prevent any other first processor core load younger in program order that the first processor core load from committing. In one embodiment, the first processor core load is not considered speculative and can commit, and all other first processor core loads executed on the first processor core that are younger than the first processor core load in program order are speculative and cannot commit before the first processor core store is performed in the shared memory.

Exemplary embodiments are also directed to a method for dynamic enforcement of store atomicity. A given processor core load is executed at a given time and at a given processor core in a plurality of processor cores. In one embodiment, the processor core load is executed by the processor core. The given processor core load is associated with a first memory location. Data for the given processor core load are received from an existing processor core store associated with the first memory location and located in a store buffer associated with the given processor core. A speculative state is assigned to a subsequent in program order processor core load executed at one of the processor cores in the plurality of processor cores to prevent the subsequent in program order processor core load from committing before the existing processor core store is performed.

In one embodiment, the speculative state assigned to the subsequent in program order processor core load is removed after the existing processor core store is performed to allow the subsequent in program order processor core load to commit. In one embodiment, the subsequent in program order processor core load is associated with a second memory location separate from the first memory location, and the subsequent in program order processor core load is squashed upon an invalidation or eviction at the second memory location. In one embodiment, the given processor core load is executed, the store buffer associated with the given processor core is searched for the existing processor core store associated with the first memory location. Data for the given processor core load are received upon location of the existing processor core store. The existing processor core store is marked with an identifier key encoding the given load, and the given processor core load is marked as a store-to-load forwarding processor core load. In one embodiment, the existing processor core store is marked with a monotonically increasing sequence number that wraps around to its lowest value when it reaches its highest value or marking the existing processor core store with an identifier that encodes a position of the given processor core load in a load queue.

In one embodiment, a determination is made regarding whether the existing processor core store is marked with an existing identifier key from a separate processor core load that is older in program order than the given processor core store. If the existing processor core store is marked with an existing identifier key, the existing identifier key is replaced with a different identifier key, and an existing store-to-load forwarding status from the separate processor core load. In one embodiment, the given processor core load is committed from a head of a load queue, and the commit gate is closed to prevent the subsequent in program order processor core load from committing. The identifier key is communicated to the commit gate.

In one embodiment, the existing processor core store is performed from the store buffer, and the commit gate is opened to allow the subsequent in program order processor core load to commit when the identifier key is marking the existing processor core store and has been communicated to the commit gate. In one embodiment, the store-to-load forwarding processor core load is identified is speculative, and the store-to-load forwarding processor core load is squashed. The identifier key is then removed. In one embodiment, identification of the store-to-load forwarding processor core load as speculative is independent from identifying the store-to-load processor core load as C-Speculative for potentially being on a wrong path of execution, D-Speculative for being performed in a presence of an older processor core store with an unresolved address, or M-Speculative for being reordered with respect to an older processor core load.

In one embodiment, the given processor core load is identified as speculative, and all processor cores loads starting at a squash point within a processor core load queue are squashed. In one embodiment, the processor core load queue contains a plurality of store-to-load forwarding processor core loads, and processor core stores in the store buffer associated with store-to-load forwarding processor core loads are marked with identifier keys. A bulk identifier key reset is utilized. All store-to-load forwarding processor core loads executed before the squash point are allowed before allowing store-to-load forwarding for processor core loads executed after the squash point. In addition, all unique identifier keys in the store buffer are reset in bulk after all store-to-load forwarding processor core loads executed before the squash point are committed.

In one embodiment, the processor core load queue includes a plurality of subsequent processor core loads, and the store buffer includes a plurality of separate existing processor core stores associated with the plurality of subsequent processor core loads. The existing processor core store and each separate existing processor core store are marked with an identifier key. An on-demand identifier key reset is utilized. A separate pointer is set from the existing processor core store to the given processor core load and from each separate existing processor core store to each subsequent processor core load. Each identifier key and each pointer is left after squashing all processor core loads, and each pointer from a load query containing the given processor core load and each subsequent processor core load to reset each identifier key is used when the existing processor core store and each separate existing processor core store is used.

Exemplary embodiments are also directed to a computer-readable medium containing a computer-readable code that when read by a computer causes the computer to perform a method for dynamic enforcement of store atomicity. A given processor core load is executed at a given time and at a given processor core in a plurality of processor cores. In one embodiment, the processor core load is executed by the processor core. The given processor core load is associated with a first memory location. Data for the given processor core load are received from an existing processor core store associated with the first memory location and located in a store buffer associated with the given processor core. A speculative state is assigned to a subsequent in program order processor core load executed at one of the processor cores in the plurality of processor cores to prevent the subsequent in program order processor core load from committing before the existing processor core store is performed.

BRIEF DESCRIPTION OF THE DRAWINGS

The accompanying drawings.

DETAILED DESCRIPTION

Figure 1:
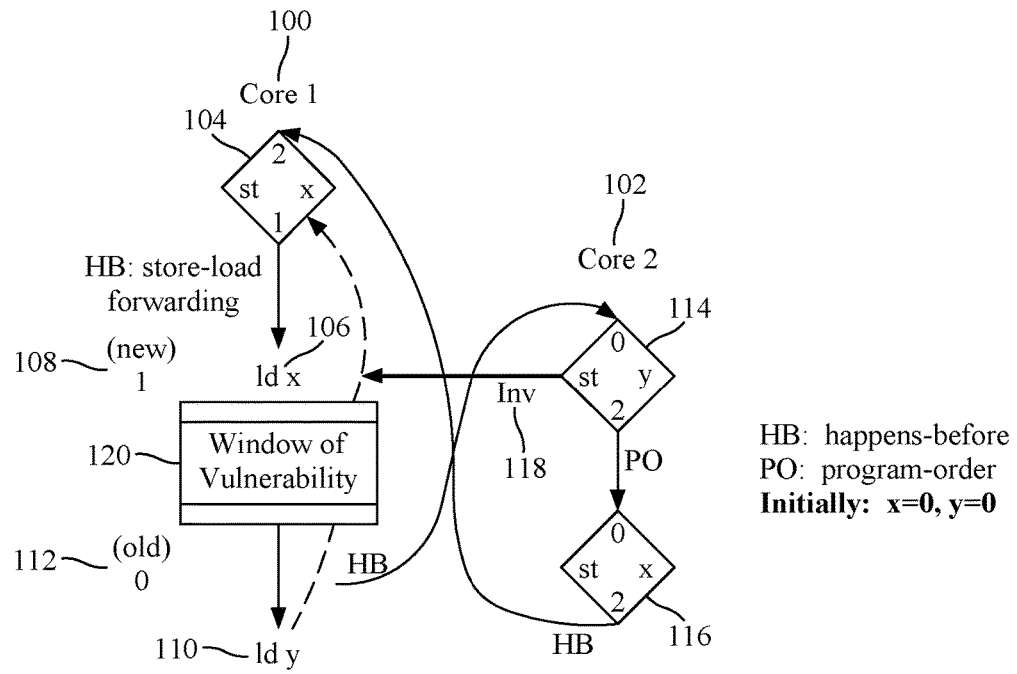
FIG. 1 is an illustration of an embodiment of a window of vulnerability for invalidations from ordered stores.

Exemplary embodiments are directed to systems and methods for dynamic enforcement of store atomicity. As used herein, write atomicity refers to how coherence treats write requests in the memory system, i.e., if a write is atomic or not. For example, a typical invalidation-based MESI protocol that acknowledges a write only after all invalidations have been performed is write-atomic. A write-atomic protocol is assumed. As used herein, the term store atomicity is used in its strict sense, i.e., all processor cores (threads) in the computing system, without exception, see a store inserted in the global memory order at the same time. A given processor core is not allowed to see its own stores before these stores are globally ordered. This is also known as multiple-copy atomic (MCA).

Exemplary embodiments utilize store buffers and Total Store Order (TSO) to relax the store→load order to accommodate the store buffers. In out-of-order execution there are actually two structures utilized, the store queue (SQ) and the store buffer (SB). Stores in the SB are committed but not yet inserted in the global memory order. Stores in the SQ are at an even earlier stage. These stores in the SQ have not been committed, i.e., they are still in the instruction window of out-of-order execution and, hence, still in the reorder buffer (ROB) of the processor core. In one embodiment, the SQ and the SB are a single physical structure, and the division between the SQ and the SB is a pointer that separates the committed stores from the uncommitted stores. A given load searches both the SQ for older-in-program-order stores and the SB to find the most recent store that exists in the SQ or SB and that is directed to the same address as the given load. This search of the SQ and SB is required to satisfy sequential execution semantics.

Exemplary embodiments apply equally well to committed stores in the SB and uncommitted stores in the SQ, and the stores can be in the SB or the SQ. The uncommitted stores in the SQ may never reach the commit stage as these uncommitted stores can be squashed for various reasons, e.g., control speculation and exceptions, among others. Because any instruction that could potentially reveal a store atomicity violation for an uncommitted store in the SQ disappears if that uncommitted store is squashed since the instruction in question must trail the uncommitted store in program order, there is no problem on squashes. To avoid repeating the inconsequential distinction between stores in the SB and stores in the SQ, references herein to stores in the store buffer are understood to include both stores in the SB and stores in the SQ. However, exemplary embodiments can utilize the SB, the SQ or both the SB and the SQ.

Implementations of TSO such as x86-TSO allow a load to be performed with a store-to-load forwarding from the store buffer. If the load is at the head of the ROB, that load can commit. This allows a subsequent load, e.g., the next younger load, to also commit when the subsequent load is performed. Other implementations of TSO, for example, IBM 370, do not allow the forwarding of a store to a load unless that store is first made globally visible to all other processor cores in the computing system. Therefore, in these implementations when a given load matches an existing store in the store buffer, the computing system waits until that particular store is written in the L1 cache before the value in the existing store is given to the load.

Sequential Consistency (SC) is a store-atomic memory model. Existing approaches for SC speculation also guarantee store atomicity. However, the invariant in existing approaches is that all loads that bypass any unperformed store are speculative by definition. In accordance with exemplary embodiment, loads receiving values from in limbo stores, i.e., stores in the store buffer, are not speculative; however, these loads are the source of speculation for younger loads that are speculative.

Violating store atomicity results in behaviors that violate the load→load ordering rule. This is not allowed in a strict, store-atomic TSO model, but violating store atomicity is allowed in x86-TSO and other TSO implementations. Two behaviors can result from violating store atomicity depending on whether ordered stores or concurrent stores, i.e., independent stores that are not bound by program or synchronization order, are observed. In a first result, ordered stores are seen in a different order than their memory order. This is a violation of the load→load order in the store-to-load forwarding processor core. In a second result, there is a disagreement between processor cores regarding the order of concurrent stores. Two processor cores that forward their stores to their loads cannot agree in which order their stores appear in memory order. This is again a violation of the load→load order. None of these behaviors can be present in a store-atomic TSO implementation.

A store-to-load forwarding can lead to a load→load reordering which, in the strict, store-atomic TSO constitutes the detection of the store atomicity violation. Store-to-load forwarding (seeing a core's own store before other cores do) does not by itself violate the store atomicity of the store. For this to happen, the core in question must also perform at least one more load access to a different memory location that happens to change while the store is still in limbo in the store buffer.

The discrepancy between when a given processor core sees its own store in relation to an external write and when other processor cores observe the given processor core store in relation to the same write signifies a store atomicity violation.

Figure 2:
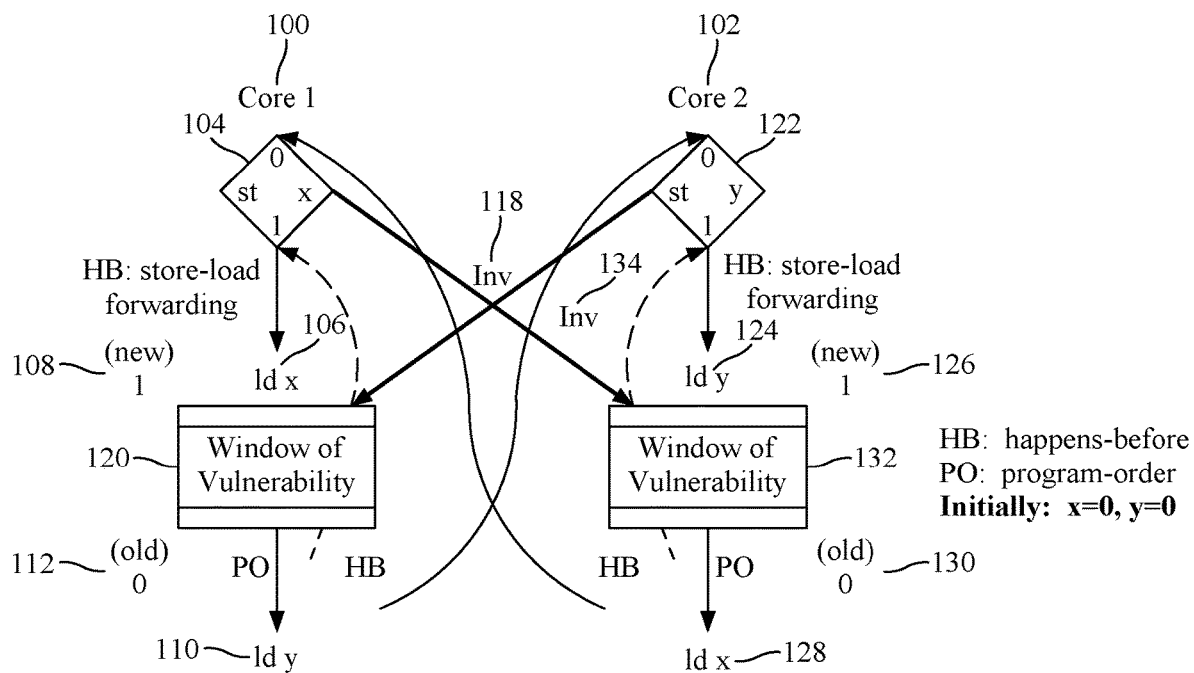
FIG. 2 is an illustration of an embodiment of a window of vulnerability for invalidations from concurrent stores.

Referring initially to FIGS. 1 and 2, an embodiment of the execution of loads and stores involving two memory addresses on a first processor core 100 and a second processor core 102 is illustrated. Both a first and second memory location initially contain the value 0. The first processor core executes a first processor core store on the first memory address, x, 104, placing this store in its store buffer. A subsequent first processor core load 106 utilizes store-to-load forwarding to obtain the new value 108 at the first memory location from the store buffer of the first processor core. The first processor core also executes a load from a second memory location, y, 110 which loads the old or initial value 112 at the memory location. The second processor core executes a store to the second memory location 114 and a store to the first memory location 116. Both of these stores change the value at these memory locations to a new value, i.e., 2.

A necessary condition for 1d y 110 to be reordered with respect to 1d x 106 in the first processor core in both FIGS.

1 and 2 is that the second processor core store to the second memory address, st y, 114 must be inserted in the memory order sometime between the load from the second memory address, 1*d* y, 110 on the first processor core being performed and seeing the old value stored at the second memory address, y, and the first processor core store to the first memory location, st x, 104 being inserted in the memory order. However, the first processor core should receive an invalidation 118 for the second memory location, y, in the same time window, which is the invalidation window of vulnerability 120 for the first processor core load to the second memory address, 1*d* y, 110.

More specifically, the reason why store atomicity is violated under x86-TSO in the first processor core in a detectable way is that the first processor core load to the second memory address, 1*d* y, 110 is able to commit and exit the reorder buffer before the end of the widow of vulnerability, i.e., before the first processor core store to the first memory location, st x, 104 is performed and written in the level one cache (L1). Nothing in the out-of-order microarchitecture can stop the first processor core load to the second memory address, 1*d* y, 110 from committing and exiting the reorder buffer. The first processor core load from the first memory location, 1*d* x, 106, which is before the first processor core load to the second memory address, 1*d* y, 110, is performed from the store buffer and commits, leaving the first processor core load to the second memory address, 1*d* y, 110 at the head of the reorder buffer. At that point the first processor core load to the second memory address, 1*d* y, 110 is already performed and can also exit the reorder buffer. An invalidation for the second memory address, y, arriving after the commit of the first processor core load to the second memory address, 1*d* y, 110 but before the first processor core store to the first memory address, st x, 104 is written in the L1, makes the reordering of the loads irrevocable, which violates strict, store-atomic TSO.

In FIG. 2, a symmetrical case is illustrated for the second processor core 102. The second processor core executes a second processor core store on the second memory address, y, 122, placing this store in its store buffer. A subsequent second processor core load 124 utilizes store-to-load forwarding to obtain the new value 126 at the second memory address from the store buffer of the second processor core. The second processor core also executes a load from the first memory location, x, 128 which loads the old or initial value 130 at the memory address. As with the first processor core, the second processor core should receive an invalidation 134 for the first memory address, x, in the same time window, which is the invalidation window of vulnerability 132 for the second processor core load to the first memory address, 1*d* x, 128.

Solutions known to guarantee store atomicity include preventing the first processor core load from the first memory address, 1*d* x, 106, i.e., the consumer load of the store-to-load forwarding, from being performed until st x is the first processor core store to the first memory address, st x, 104 ordered or treating the first processor core load from the first memory address, 1*d* x, 106 as speculative, and therefore, not allowing it to commit, until the store buffer of the first processor core empties. The first solution, can be a serious impediment to performance as no instruction dependent that is dependent on the first processor core load from the first memory address, 1*d* x, 106 can progress, but the first processor core load to the second memory address, 1*d* y, 110 is kept speculative for the window of vulnerability since there is an older unperformed load in the reorder buffer before it. Thus, within this window of vulnerability, if the first processor core load to the second memory address, 1*d* y, 110 is matched by an invalidation, this load is squashed as a speculative load, which prevents its reordering.

An eviction of cacheline y that occurs during the invalidation window of vulnerability of the first processor core load to the second memory address, 1*d* y, 110 has the undesirable effect of filtering out a possible invalidation, making the load reordering in this case inevitable. As a precautionary measure, to fend against this possibility, evictions are treated the same as invalidations. The same policy is used for speculative load reordering in actual systems.

Exemplary embodiments, make the first processor core load to the second memory address, 1*d* y, 110 speculative until the first processor core store to the first memory address, st x, 104 is ordered. If an invalidation is received for the second memory address, y, in the interim, the first processor core load to the second memory address, 1*d* y, 110 is squashed and re-executed. Regarding the symmetrical case illustrated in FIG. 2, exemplary embodiments make the second processor core load to the first memory address, 1*d* x, 128 speculative until the second processor core store to the second memory address, st y, 124 is ordered. If an invalidation is received for the first memory address, x, in the interim, the second processor core load to the first memory address, 1*d* x, 128 is squashed and re-executed.

Loads can be speculative in an out-of-order processor core, and these loads have previously been defined as M-Speculative, C-Speculative and D-Speculative. For M-Speculative, the load is performed, i.e., receives its data, before a previous unperformed load. The oldest unperformed load is called the Source of Speculation or SoS load. In C-Speculative, there is an unresolved branch before the load, i.e., the load might be on the wrong path. In D-Speculative, there is an unresolved store before the load, and the load was issued speculatively assuming no dependence with the store.

Exemplary embodiments utilize a new type of state of speculation, Store-Atomicity Speculative (SA-Speculative). A load is SA-Speculative if an older (in program order) load is performed via a store-to-load forwarding. The load performed by store-to-load forwarding that receives its value or data from a store in the store buffer is not speculative; however, all loads following the load performed by store-to-load forwarding are potentially speculative. For example, the SA-Speculative state of a the first processor core load to the second memory address, 1*d* y, holds from the moment it is performed to the moment the first processor core store to the first memory address, st x, that was involved in the store-to-load forwarding, with the first processor core load from the first memory address, 1*d* x, preceding 1*d* y, is performed or writes to memory. Therefore, while a load is SA-Speculative it cannot commit and must be squashed and re-executed if matched by an invalidation or eviction.

The load that is involved in a store-to-load forwarding, e.g., the SLF-load (Store-to-Load-Forwarded load), is the source of the store-atomicity speculation for all younger loads. To cast a younger load as SA-Speculative an older in program order SLF-load is used irrespective of when the store-to-load forwarding takes place with respect to when the younger load is performed, e.g., the store-to-load forwarding can occur (chronologically) after the younger load has been performed (the younger load starts as M-Speculative and becomes SA-Speculative when the older load is performed) or whether the SLF load is even in the reorder buffer by the time a younger load is performed. The SLF load may have already committed by that time.

In one embodiment, multiple store-to-load forwardings, the overlapping SA-speculative "shadows" these store-to-load forwardings cast over younger loads, and the points when such shadows are lifted are tracked as stores exit the store buffer. Exemplary embodiments as described herein add negligible hardware overhead and do not penalize energy or performance.

In one embodiment, an SLF load establishes a connection between a given store in the store buffer and a commit gate at the head of the load queue (LQ) using an identifier key or sentinel, thereby preventing the commit of any younger SA-Speculative loads until the store is ordered. In one embodiment, the identifier key identifies the load and encodes load order. In one embodiment, the identifier key is a monotonically increasing sequence number, where a lower value indicates an older load. In one embodiment, the identifier key is the position of the load in the LQ and is augmented by an extra bit, i.e., the sorting bit, to account for the wrap-around as the LQ is typically a circular buffer. In this embodiment the identifier key contains both a direct pointer to the LQ entry and encodes the correct relative order of the loads in the LQ. The SLF load can freely commit, provided the its SLF load is not prevented by an even older SLF load. In one embodiment the reorder buffer (ROB) is used in the place of the LQ.

Figure 3:
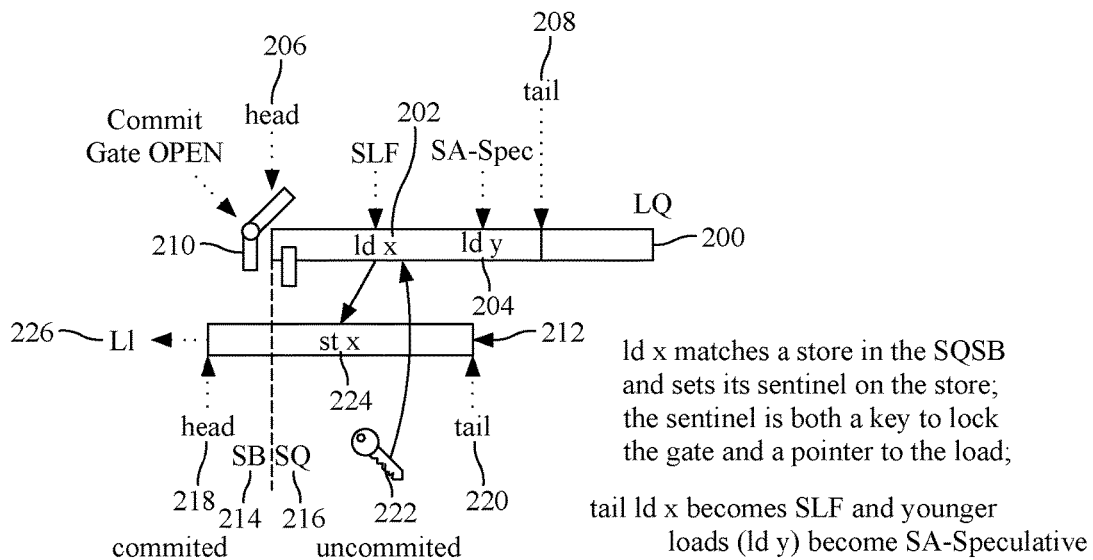
FIG. 3 is a schematic illustration of an embodiment of the operation of a commit gate when a load receives its value from a store.
Figure 4:
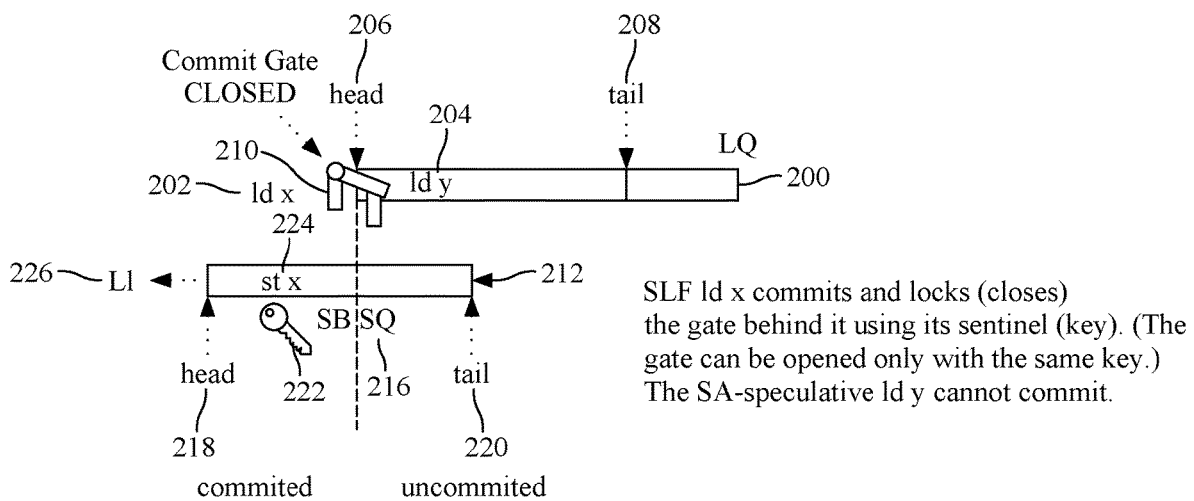
FIG. 4 is a schematic illustration of an embodiment of the operation of a commit gate when the load commits and the commit gate is closed.
Figure 5:
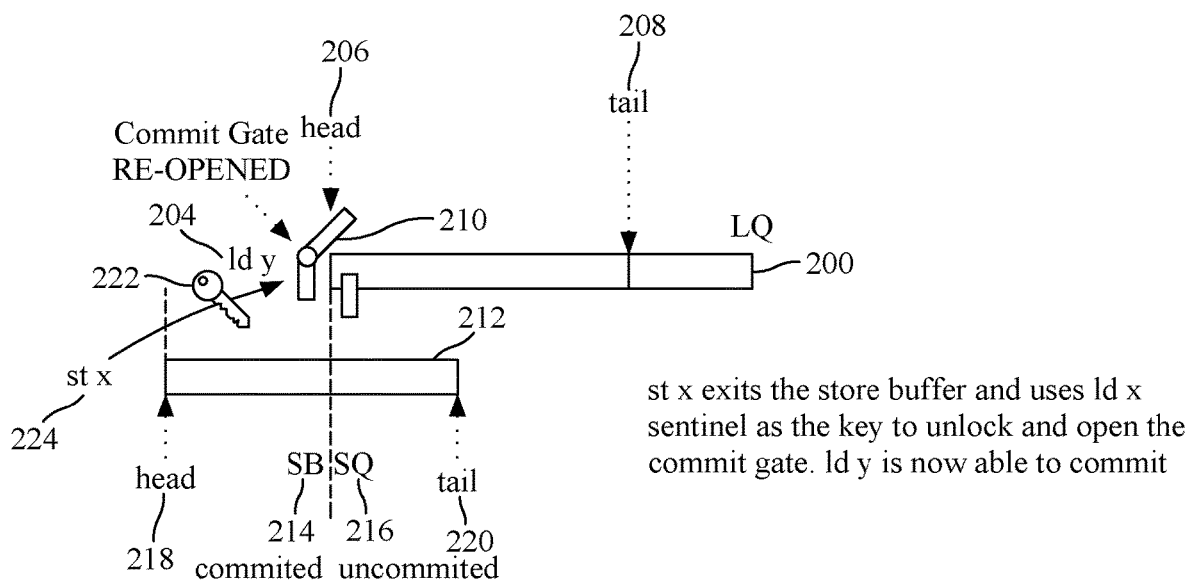
FIG. 5 is a schematic illustration of an embodiment of the operation of a commit gate when the store exits the store buffer and the commit gate is re-opened.

Referring now to FIGS. 3-5, the stages of an exemplary embodiment of a system and method for the dynamic enforcement of store atomicity is illustrated. FIG. 3 illustrates a load queue 200 having a head 206 and a tail 208 and containing a first processor core load from a first address, 1*d* x, 202 and a first processor core load from a second address, 1*d* y, 204. A commit gate 210 in an open position is disposed at the head of the load queue. The first processor core load from the first address is earlier in program time than that first processor core load from the second address. The first processor core includes a storage buffer 212 containing a head 218 and a tail 220 and including both a committed stores portion 214 and an uncommitted stores portion 216. When the first processor core load from the first memory address executes, it searches the store buffer for a matching store 224, i.e., a store to the first memory address. When a matching store is found, the first processor core load from the first memory address takes its value or data from the store to the first memory address. After the first processor core load from the first memory address receives the value from the first processor core store, the first processor core load attempts to mark the first processor core store in the store buffer with a sentinel or identifier key 222 and to mark the first processor core load to the first memory address as being SLF. If the first processor core store to the first memory address has no previous identifier key, this attempt succeeds, and the first processor core load to the first memory location becomes an SLF load. The subsequent first processor core load to the second memory address becomes a SA-Speculative load.

When a given load attempts to set its identifier key on a store in the SB, there is a chance that the store has already forwarded its value to another load. Because loads can execute out of order, an earlier executing but younger in program order load may have set its identifier key on the store. In this case, the later executing but older in program order load should replace the existing identifier key with its own identifier key. This is a requirement for correctness as the older load casts a SA-Speculative shadow on the younger load and not vice versa. The resulting rule is that an older load replaces the identifier key of a younger load in a store. As each identifier key encodes order, a simple comparison of identifier keys can be used to determine the proper order and which an identifier key is replaced.

If a load fails to replace an existing identifier key on a store, then that load is younger than the SLF load that set the existing identifier key. If, however, the load succeeds and replaces the existing identifier key, that load becomes the SLF load. In addition, the load strips the SLF status from the younger load that had previously set the identifier key as the replaced identifier key is a pointer to the younger load's position in the load queue. The invariant is that there can be only one SLF load per store in the SB.

Referring to FIG. 4, the first processor core load from the first memory address commits, passing the head of the load queue and through the open commit gate. The commit gate 210 is then closed, preventing all younger loads in the load queue from committing and passing the head of the load queue. In one embodiment, the commit gate is a single bit and an identifier key register. The gate bit indicates if the gate is closed, i.e., no loads can commit, or open, i.e., loads can freely commit. Loads at the head of the LQ, or ROB, consult this bit to see if the gate is open so that they can commit. The identifier key register, or gate sentinel, is the lock to the gate. If set, the gate is locked and can only be unlocked, i.e., opened, with the same identifier key contained in the register. When an SLF load commits (assuming the gate is already open), that SLF load closes the gate behind it and locks it with its identifier key. The same identifier key exists in the corresponding processor core store to the first memory location, which is not located in the committed portion of the store buffer.

Referring to FIG. 5, the first processor core store to the first memory address 224 passes the head end 218 of the store buffer 212 and is written into the level one cache 226 (FIGS. 3 and 4) associated with the first processor core. If the commit gate is closed, the first processor core store to the first memory address checks the gate identifier key to see if it has the identical key to unlock the commit gate. If the first processor core store to the first memory address has the identical identifier key, the first processor core store to the first memory address unlocks and opens the commit gate. Younger loads such as the first processor core load to the second memory address 204 can now commit. There is no need to go to the LQ because the SLF load is not there as it has locked the gate with its key on commit.

If the commit gate is unlocked or is locked with another identifier key, the corresponding SLF load must still be in the LQ. Since the store is exiting the store buffer, the SLF load is converted into an ordinary load as this store should not be able to lock the gate. The store identifier key is the pointer to the SLF load's entry in the LQ; therefore, a direct access to the LQ strips the load of its SLF status. An SLF load at the head of the LQ that is about to lock the gate can find the corresponding store with the same key in the store buffer. If the store had already left the store buffer, that load would not be SLF.

An SLF load can be speculative for reasons other than store atomicity. As described above, these reasons include C-Speculative, D-Speculative and M-Speculative. Any of these reasons can result in a squash of SLF loads. When SLF loads are squashed, the corresponding stale identifier keys in the store buffer are removed to prevent those state unique identifier keys from being used to unmark future SLF loads mistakenly.

Embodiments for removing stale identifier keys include, but are not limited to, bulk identifier key reset and on demand identifier key reset. For bulk sentinel reset, a squash is performed beginning at a particular instruction in the ROB onwards. This defines a squashed set of instructions, and all SLF loads contained within the squashed set of instructions remove their identifier keys from the store buffer. In one embodiment, before any new store-to-load forwarding is allowed for new loads executed after the squash, all SLF loads before the squash point are committed. When all the loads before the squash point commit, all identifier keys in the store buffer are bulk-reset. In parallel to these steps, the policy for setting and removing sentinels is changed. In one embodiment, no new identifier keys are set for such instructions, until the bulk-reset is complete whether new instructions are brought in the ROB or squashed instructions re-executed in place. Stores exiting the store buffer do not attempt to change the SLF status of squashed instructions i.e., stores will discard any identifier key that is equal to or younger than the squash point, because the LQ positions may have been reclaimed. Reclaiming the LQ position may cause the unique identifier keys in the store buffer to point to the wrong loads. In this embodiment, there is no need to search the store buffer or the LQ to squash identifier keys. On misspeculations, a new store-load-forwarding may be stalled if that new store-load-forwarding comes too soon before the loads that are in front of the squash point have a chance to commit and bulk-reset the stale identifier keys in the storage buffer.

For on demand identifier key reset, stale identifier keys are left in the store buffer after a squash and are fixed when those identifier keys are used or replaced. In this embodiment an additional pointer per LQ entry is used to manipulate sentinels in the store buffer from the LQ side. On a store-to-load forwarding, the SLF load sets its identifier key on the store, and the store sets its additional pointer in the LQ entry. On a squash, all SLF marks and store pointers in the loads are left untouched.

Squashed stores in the store buffer are completely initialized including their identifier key fields when those stores are re-claimed by new stores. Remaining stores may have stale sentinels that point to squashed SLF loads. A store that tries to remove the SLF status from an LQ entry (irrespective of what is in the LQ entry at that point), succeeds only if it finds its own store pointer in there. A new load, after a squash, may find its LQ entry already tagged as SLF (by the previous occupant). When it executes, it must fix a potential stale sentinel, before it sets a new one. If the load does not match a store in the store buffer (i.e., no store-to-load forwarding) it simply resets its stale SLF status and clears the store pointer. If the load does match a store in the store buffer (i.e., a new store-to-load forwarding) it must check whether the store already has a sentinel. This sentinel is considered as potentially stale only if it is older than the sentinel of the new load. The existing sentinel points to a load. If that load is not performed, the sentinel is stale and is replaced. Otherwise, some older load has already correctly set its sentinel on the store and the new forwarding does not result in a new SLF load.

Figure 6:
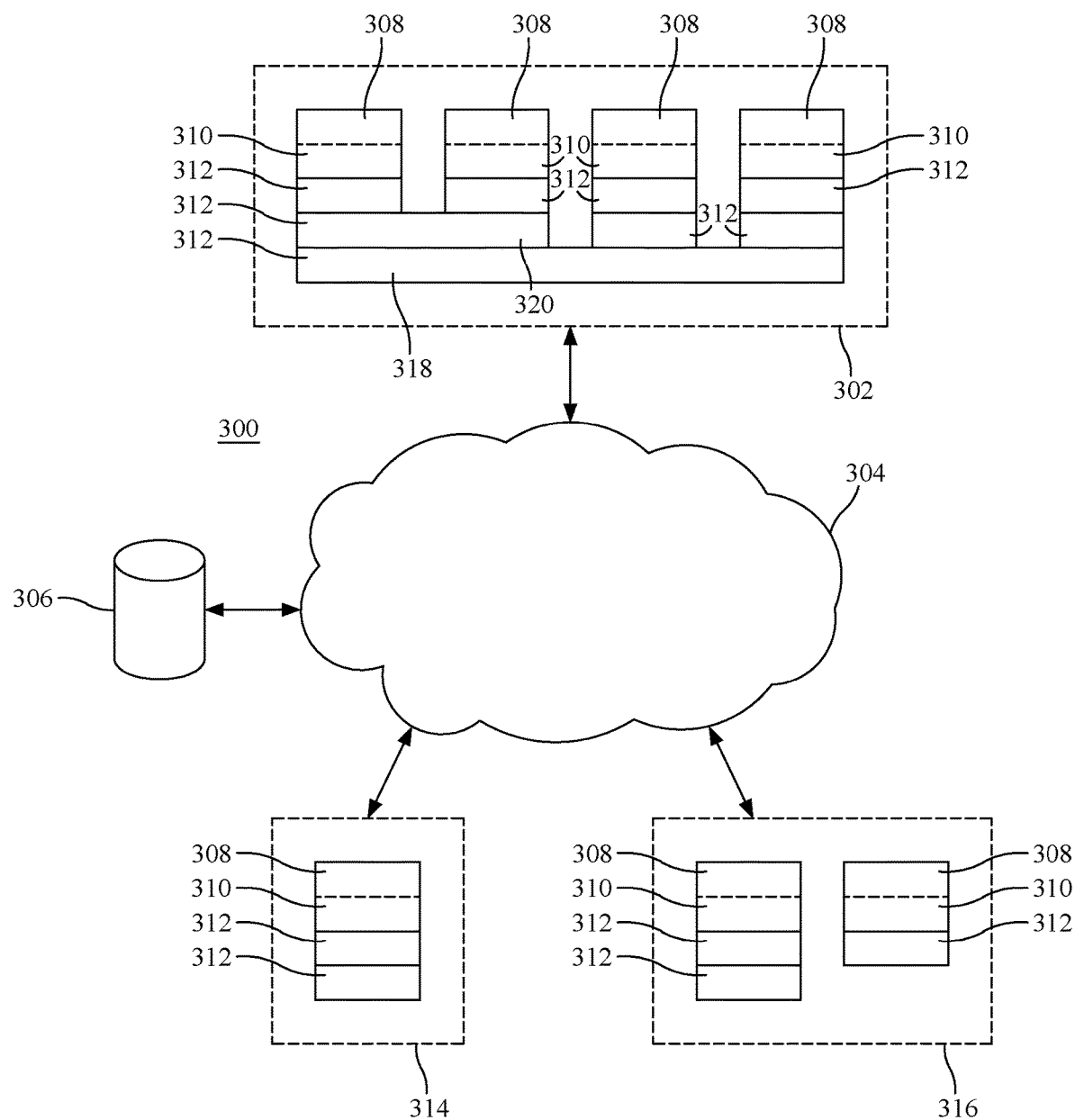
FIG. 6 is a schematic representation of an embodiment of a computing system for the dynamic enforcement of store atomicity.

Referring now to FIG. 6, exemplary embodiments are directed to a computing or computer system 300 the for dynamic enforcement of store atomicity. The computer system includes a plurality of processor cores 308. These processor cores include separate physical processor cores and partitions on a single processor core. In one embodiment, the plurality of processor cores a located on a single computer or server 302. Alternatively, the plurality of processor cores are located in a distributed computing system on multiple computer or servers including multiple single processor core computers or servers 314, one or more computers or servers containing two or more processor cores 312, 316, and combinations thereof. In a distributed implementation, all computers, servers and processor cores are in communication across one of more local or wide area networks 304. The computers, servers and processor cores can be contained within a single domain or distributed across multiple domains.

Each processor core includes its own physical store buffer 310 to hold uncommitted stores or committed stores that have not been performed in the memory system. Suitable store buffers are described herein. Each separate store buffer is associated with and operatively coupled to each processor core for placing processor core stores from the associated processor core when the processor core stores are executed and before the processor core stores are performed in the shared memory. The computer system also includes a plurality of cache memory 312. In one embodiment, the cache is arranged in a plurality of levels, e.g., L1, L2, L3, etc. Exemplary embodiments support any number of cache levels. The cache levels can be consistent across all processor cores or can vary among the processor cores. The levels of cache include cache dedicated and private to a single or a given processor core, e.g., L1, L2. Therefore, a separate local cache memory is associated with and operatively coupled to each processor core, and each local cache memory contains cache lines only accessible by the processor core associated with that local cache memory.

In addition, some levels of cache may be shared with a sub-cluster of cores, 320. Other levels of cache, e.g., L3 or LastLevelCache (LLC), are shared with all cores either in a single processor chip on a given computer or server 322 or are shared across multiple processor chips on multiple computers and servers in a distributed computing system. Therefore, the computer system includes a shared memory operatively coupled to the local cache memory of each processor core and accessible by each processor core. The computer system can include one or more databases 306 accessible by each processor core and containing data and executable computer code that can be used to perform the functions and operations of the computer system as described herein.

The computer system includes a coherence mechanism to keep processor cores and shared memory coherent. In one embodiment, a cache coherence protocol, either bus-snooping based or directory based, that keeps caches coherent and manages the writing of cache lines is utilized or assumed. Write atomicity refers to how the cache coherence protocol treats write requests in the memory system, i.e., if a write is atomic or not. For example, a typical invalidation-based MESI, or MOESI or MOESIF protocol, among other protocols that acknowledges a write only after all invalidations have been performed is write-atomic. A write-atomic protocol is assumed. In a write-atomic coherence protocol when a store is allowed to write its value in a cache line the store is considered globally performed and visible by all cores. As used herein, the term store atomicity is used in its strict sense, i.e., all cores (threads) in the system, without exception, see a store inserted in the global memory order at the same time. A core is not allowed to see its own stores before these stores are globally ordered. This is also known as multiple-copy atomic (MCA).

The computing system includes at least one load queue associated with and operatively coupled to each processor core. The load queue includes a head and tail, and all processor core loads for all processer cores operatively coupled to the load queue. In one embodiment, the load queue contains a first processor core load and all other first processor core loads. The computing system utilizes identifier keys encoding a load order and associated with given processor cores loads and stores, e.g., the first processor core load and the first processor core store. To utilize identifier keys, the computing system includes a commit gate located at the head of the load queue. The commit gate includes a single gate bit and a identifier key register. The gate bit has a closed state where no processor core loads can commit and an open state where processor core loads can commit. The identifier key registered in the commit gate is used to authorize moving the gate bit from the closed state to the open state.

In one embodiment, a first processor core load on a first processor core within the computing system receives a value at a first time from a first processor core store in the store buffer of the first processor core. The first processor core load prevents any other first processor core load younger than the first processor core load in program order from committing until at the earliest a second time when the first processor core store is performed globally in the memory system and visible to all processor cores. Therefore, in one embodiment, the first processor core load is not considered speculative and can commit and all other first processor core loads executed on the first processor core at times subsequent to the first time are speculative and cannot commit before the first processor core store is performed in the shared memory. In one embodiment, the computing system includes a tracking mechanism in communication with the store buffer associated with the first processor core to tag the first processor core store, to determine when the first processor core store exits the store buffer and to notify the first processor core to stop preventing any other first processor core load younger in program order that the first processor core load from committing.

At any time between the first time and the second time, any other first processor core load younger in program order than the first processor core load and having an address matched by a coherence invalidation caused by another processor core or having an address matched by an eviction in any local cache memory associated with the first processor core is squashed. Only the first processor core load is capable of passing the head to commit before the first processor core store is performed.

Figure 7:
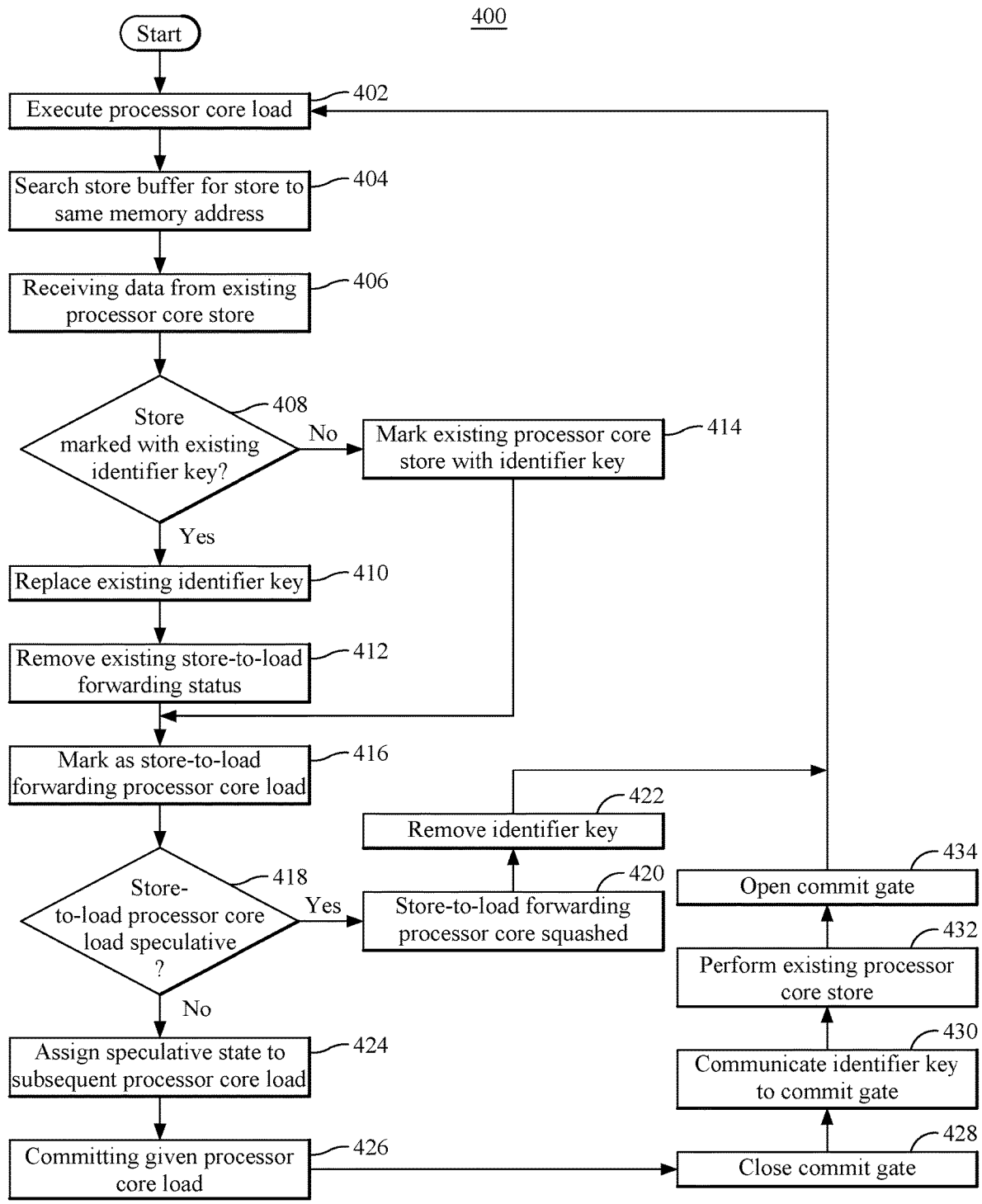
FIG. 7 is a flow chart illustrating an embodiment of a method for the dynamic enforcement of store atomicity.

Referring now to FIG. 7, exemplary embodiments are also directed to a method for dynamic enforcement of store atomicity in computing systems containing multiple processor cores 400. A given processor core load is executed 402 at a given time, e.g., a given program time, and at a given processor core in a plurality of processor cores. In one embodiment, the given processor core load is associated with a first memory location. Upon executing the given processor core load, the store buffer associated with the given processor core is searched for an existing processor core store in the store buffer that is associated with the first memory location 404.

Upon locating the existing processor core store, data for the given processor core load is received from an existing processor core store associated with the first memory location and located in a store buffer associated with the given processor core 406. A determination is made regarding whether the existing processor core store is marked with an existing identifier key from a separate processor core load that is older in program order than the given processor core store 408. If the existing processor core store is marked with an existing identifier key, the existing identifier key is with a different identifier key 410, and an existing store-to-load forwarding status is removed from the separate processor core load that marked the existing processor core store with that identifier key 412.

If the existing processor core store is not marked with an existing identifier key, the existing processor core store is marked with an identifier key encoding the given load 414. In one embodiment, the existing processor core store is marked with a monotonically increasing sequence number or is marked with a position of the given processor core load in a load queue. While identifier keys can be reused for different stores and loads, a given identifier key is used to uniquely mark a given load and store pair until it is removed or no longer needed. Having marked the existing processor core store with the identifier key or replaced an existing identifier key, the given processor core load is marked as a store-to-load forwarding processor core load 416.

In one embodiment, a determination is made regarding whether the store-to-load processor load is speculative. In one embodiment, the store-to-load processor load is speculative by identifying the store-to-load processor core load as SA-Speculative or C-Speculative for potentially being on a wrong path of execution, D-Speculative for being performed in a presence of an older processor core store with an unresolved address, or M-Speculative for being reordered with respect to an older processor core load. In one embodiment, the store-to-load processor core load is identified as at least one of SA-Speculative, C-Speculative, D-Speculative and M-Speculative. If the store-to-load forwarding processor core load is identified as speculative, the store-to-load forwarding processor core load is squashed, and the identifier key is removed from the load and the existing processor core store.

The SA-Speculative state is orthogonal to or independent of C-Speculative, D-Speculative and M-Speculative states. Therefore, SA-Speculative is a new state that can co-exist and overlap with other types of speculation. Speculation types like the C-Speculative (branches) and the D-Speculative (independence on a prior-in-program-order store with an unresolved address) can be correct or wrong. If a speculation is wrong, the speculative instructions and (typically) all following instructions are squashed rather than being committed or retired. The SA-Speculation and the M-Speculation are correct if no invalidation matches (or catches) the load from the time the load becomes speculative to the time the load reaches the stage when the load can retire. In SA-Speculation, the time a load can retire is controlled by the store that participated in a store-to-load forwarding.

If the store-to-load forwarding processor core load is not speculative, a speculative state is assigned to a subsequent in program order processor core load 424 executed at one of the processor cores in the plurality of processor cores to prevent the subsequent in program order processor core load from committing before the existing processor core store is performed. In one embodiment, the subsequent in program order processor core load is associated with a second memory location separate from the first memory location. The subsequent in program order processor core load is squashed upon an invalidation or eviction at the second memory location.

In one embodiment, the given processor core load is identified as speculative, and all processor cores loads are squashed starting at a squash point within a processor core load queue. In one embodiment, the processor core load queue includes a plurality of store-to-load forwarding processor core loads, and the processor core stores in the store buffer that are associated with store-to-load forwarding processor core loads are marked with identifier keys. In one embodiment, a bulk identifier key reset is used. All store-to-load forwarding processor core loads executed before the squash point are committed before allowing store-to-load forwarding for processor core loads executed after the squash point. In addition, all identifier keys in the store buffer are reset in bulk after all store-to-load forwarding processor core loads executed before the squash point are committed.

In another embodiment, the processor core load queue includes a plurality of subsequent processor core loads, and the store buffer includes a plurality of separate existing processor core stores associated with the plurality of subsequent processor core loads. The existing processor core store and each separate existing processor core store marked with an identifier key. In this embodiment, an on-demand identifier key reset is performed. A separate pointer is set from the existing processor core store to the given processor core load and from each separate existing processor core store to each subsequent processor core load. Each identifier key and each pointer is left after squashing all processor core loads, and each pointer from a load query containing the given processor core load and each subsequent processor core load is used to reset each identifier key when the existing processor core store and each separate existing processor core store is used.

The given processor core load is committed from the head of the load queue 426. The commit gate is closed 428 to prevent the subsequent in program order processor core load from committing, and the identifier key is communicated to the commit gate 430. The existing processor core store is performed from the store buffer 432, and the commit gate is opened 434 to allow the subsequent in program order processor core load to commit when the identifier key is marking the existing processor store and has been communicated to the commit gate. In one embodiment, the speculative state assigned to the subsequent in program order processor core load is removed after the existing processor core store is performed to allow the subsequent in program order processor core load to commit.

Exemplary embodiments are also directed to computer-readable medium containing a computer-readable code that when read by a computer causes the computer to perform a method for dynamic enforcement of store atomicity as described herein. Suitable computer-readable storage mediums include non-transitory computer-readable storage mediums.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
    a plurality of processor cores;
    a separate local cache memory associated with and operatively coupled to each processor core and each local cache memory comprising cache lines only accessible by the processor core associated with that local cache memory;
    a shared memory operatively coupled to each local cache memory and accessible by each processor core;
    a separate store buffer associated with and operatively coupled to each processor core for placing processor core stores from the associated processor core when the processor core stores are executed and before the processor core stores are performed in the shared memory; and
    a coherence mechanism to keep processor cores and shared memory coherent;
    wherein a first processor core load on a first processor core receives a value at a first time from a first processor core store in the store buffer of the first processor core and prevents any other first processor core load younger than the first processor core load in program order from committing until at the earliest a second time when the first processor core store is performed globally in the memory system and visible to all cores; and
    wherein between first time and the second time any other first processor core load younger in program order than the first processor core load and having an address matched by a coherence invalidation caused by another processor core or having an address matched by an eviction in any local cache memory associated with the first processor core is squashed.

2. The computer system of claim 1, wherein each store buffer comprises committed processor core stores and uncommitted processor core stores.

3. The computer system of claim 1, further comprising a load queue associated with and operatively coupled to each processor core and comprising a head, the load queue containing the first processor core load and all other first processor core loads and only the first processor core load capable of passing the head to commit before the first processor core store is performed.

4. The computer system of claim 3, further comprising:
    a identifier key encoding a load order and associated with the first processor core load and the first processor core store;
    a commit gate located in the load queue and comprising a single gate bit and a identifier key register, the gate bit comprising a closed state where no processor core loads can commit and an open state where processor core loads can commit, the identifier key registered in the commit gate and used to authorize moving the gate bit from the closed state to the open state.

5. The computer system of claim 4, further comprising a tracking mechanism in communication with the store buffer associated with the first processor core to tag the first processor core store, to determine when the first processor core store exits the store buffer and to notify the first processor core to stop preventing any other first processor core load younger in program order that the first processor core load from committing.

6. The computer system of claim 1, wherein the first processor core load is not considered speculative and can commit and all other first processor core loads executed on the first processor core that are younger than the first processor core load in program order are speculative and cannot commit before the first processor core store is performed in the shared memory.

7. A method for dynamic enforcement of store atomicity, the method comprising:

executing a given processor core load at a given time and at a given processor core in a plurality of processor cores, the given processor core load associated with a first memory location;

receiving data for the given processor core load from an existing processor core store associated with the first memory location and located in a store buffer associated with the given processor core; and assigning a speculative state to a subsequent in program order processor core load executed at one of the processor cores in the plurality of processor cores to prevent the subsequent in program order processor core load from committing before the existing processor core store is performed.

8. The method of claim 7, wherein the method further comprises removing the speculative state assigned to the subsequent in program order processor core load after the existing processor core store is performed to allow the subsequent in program order processor core load to commit.

9. The method of claim 7, wherein:
the subsequent in program order processor core load is associated with a second memory location separate from the first memory location; and
the method further comprises squashing the subsequent in program order processor core load upon an invalidation or eviction at the second memory location.

10. The method of claim 7, wherein:
executing the given processor core load comprises searching the store buffer associated with the given processor core for the existing processor core store associated with the first memory location;
receiving data for the given processor core load comprises receiving data upon location of the existing processor core store; and
the method further comprises:
marking the existing processor core store with an identifier key encoding the given load; and
marking the given processor core load as a store-to-load forwarding processor core load.

11. The method of 10, wherein marking the existing processor core store with the identifier key comprises marking the existing processor core store with a monotonically increasing sequence number that wraps around to its lowest value when it reaches its highest value or marking the existing processor core store with an identifier that encodes a position of the given processor core load in a load queue.

12. The method of claim 10, wherein:
the method further comprises determining that the existing processor core store is marked with an existing identifier key from a separate processor core load that is older in program order than the given processor core store; and
marking the existing processor core store with the identifier key comprises:
replacing the existing identifier key with a different identifier key; and
removing an existing store-to-load forwarding status from the separate processor core load.

13. The method of claim 10, wherein the method further comprises:
committing the given processor core load from a head of a load queue;
closing the commit gate and to prevent the subsequent in program order processor core load from committing; and
communicating the identifier key to the commit gate.

14. The method of claim 13, wherein the method further comprises:
performing the existing processor core store from the store buffer; and
opening the commit gate and to allow the subsequent in program order processor core load to commit when the identifier key is marking the existing processor core store and has been communicated to the commit gate.

15. The method of claim 10, wherein the method further comprises:
identifying the store-to-load forwarding processor core load as speculative;
squashing the store-to-load forwarding processor core load; and
removing the identifier key.

16. The method of claim 15, wherein identifying the store-to-load forwarding processor core load as speculative is independent of identifying the store-to-load processor core load as C-Speculative for potentially being on a wrong path of execution, D-Speculative for being performed in a presence of an older processor core store with an unresolved address, or M-Speculative for being reordered with respect to an older processor core load.

17. The method of claim 7, wherein the method further comprises:
identifying the given processor core load as speculative; and
squashing all processor cores loads starting at a squash point within a processor core load queue.

18. The method of claim 17, wherein:
the processor core load queue comprises a plurality of store-to-load forwarding processor core loads;
processor core stores in the store buffer associated with store-to-load forwarding processor core loads are marked with identifier keys; and
the method further comprises performing a bulk identifier key reset by:
committing all store-to-load forwarding processor core loads executed before the squash point before allowing store-to-load forwarding for processor core loads executed after the squash point; and
resetting all identifier keys in the store buffer in bulk after all store-to-load forwarding processor core loads executed before the squash point are committed.

19. The method of claim 17, wherein:
the processor core load queue comprises a plurality of subsequent processor core loads;
the store buffer comprising a plurality of separate existing processor core stores associated with the plurality of subsequent processor core loads, the existing processor core store and each separate existing processor core store marked with an identifier key; and
the method further comprises performing an on-demand identifier key reset, by:
setting a separate pointer from the existing processor core store to the given processor core load and from each separate existing processor core store to each subsequent processor core load;
leaving each identifier key and each pointer after squashing all processor core loads; and
using each pointer from a load query containing the given processor core load and each subsequent processor core load to reset each identifier key when the existing processor core store and each separate existing processor core store is used.

20. A computer-readable medium containing a computer-readable code that when read by a computer causes the computer to perform a method for dynamic enforcement of store atomicity, the method comprising:
- executing a given processor core load at a given time and at a given processor core in a plurality of processor cores, the given processor core load associated with a first memory location;
- receiving data for the given processor core load from an existing processor core store associated with the first memory location and located in a store buffer associated with the given processor core; and
- assigning a speculative state to a subsequent in program order processor core load executed at one of the processor cores in the plurality of processor cores to prevent the subsequent in program order processor core load from committing before the existing processor core store is performed.

* * * * *